US012706445B2

(12) United States Patent
Bailey et al.

(10) Patent No.: US 12,706,445 B2
(45) Date of Patent: Aug. 11, 2026

(54) PRINTED CIRCUIT SPARK GAP WITH ENHANCED SPARK OVER VOLTAGE TO PROTECT AN ELECTRONIC DEVICE CONNECTED TO THE SPARK GAP

(71) Applicant: PPC BROADBAND, INC., East Syracuse, NY (US)

(72) Inventors: Paul Bailey, Camillus, NY (US); David Barany, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 14 days.

(21) Appl. No.: 18/622,607

(22) Filed: Mar. 29, 2024

(65) Prior Publication Data

US 2024/0332914 A1 Oct. 3, 2024

Related U.S. Application Data

(60) Provisional application No. 63/456,408, filed on Mar. 31, 2023.

(51) Int. Cl.
*H01T 4/02* (2006.01)

(52) U.S. Cl.
CPC .................................... *H01T 4/02* (2013.01)

(58) Field of Classification Search
None
See application file for complete search history.

(56) References Cited

U.S. PATENT DOCUMENTS

2011/0194225 A1* 8/2011 Onishi ..................... H01T 4/10 361/212
2011/0222197 A1* 9/2011 Adachi .................... H02H 9/04 29/592.1
2012/0014029 A1* 1/2012 Zimmermann .......... H01C 7/12 361/118
2012/0039010 A1 2/2012 Tresness
2014/0126102 A1* 5/2014 Sumi ...................... H05K 1/026 427/78
2014/0240878 A1* 8/2014 Otsubo .................... H02H 9/04 361/56

(Continued)

FOREIGN PATENT DOCUMENTS

WO 2009001649 A1 12/2008

OTHER PUBLICATIONS

International Search Report and Written Opinion dated Jul. 15, 2024 in corresponding International Application No. PCT/US2024/022387, 11 pages.

*Primary Examiner* — Kenneth B Wells
(74) *Attorney, Agent, or Firm* — MH2 TECHNOLOGY LAW GROUP LLP

(57) ABSTRACT

A spark gap is configured to provide an enhanced spark over voltage. The spark gap includes a non-smooth textured substrate surface, a first conducting electrode, a second conducting electrode, a gap configured to be disposed between the first and second conducting electrodes, and a conductive material configured to be disposed in a non-continuous and irregular manner on the non-smooth textured substrate surface and in the gap between the first and second conducting electrodes, wherein the spark gap is structurally configured to provide an enhanced spark over voltage to protect any device connected to the spark gap.

33 Claims, 13 Drawing Sheets

(56) References Cited

U.S. PATENT DOCUMENTS

| | | | | |
|---|---|---|---|---|
| 2014/0327993 | A1* | 11/2014 | Sumi | H01T 1/20<br>29/875 |
| 2014/0347779 | A1* | 11/2014 | Asakura | H05F 3/04<br>361/220 |
| 2016/0104999 | A1* | 4/2016 | Yasunaka | H01T 4/12<br>361/112 |
| 2021/0242664 | A1* | 8/2021 | Bailey | H02H 9/06 |
| 2024/0088652 | A1* | 3/2024 | Topcagic | H01T 4/10 |

* cited by examiner $$|V_{out}| = |V_{in}| \frac{1}{\sqrt{1 + \omega^2 R^2 C^2}}$$

PRINTED CIRCUIT SPARK GAP WITH ENHANCED SPARK OVER VOLTAGE TO PROTECT AN ELECTRONIC DEVICE CONNECTED TO THE SPARK GAP

CROSS REFERENCE TO RELATED APPLICATION

This application claims the benefit of U.S. Provisional Patent Application No. 63/456,408, filed Mar. 31, 2023, the contents of which are incorporated herein by reference.

BACKGROUND

A spark gap typically includes an arrangement of two conducting electrodes separated by a gap. The gap is usually filled with a gas such as air, and is designed to allow an electric spark to pass between the conducting electrodes. When the potential difference between the conducting electrodes exceeds the breakdown voltage of the gas within the gap, a spark forms, ionizing the gas and drastically reducing its electrical resistance. An electric current then flows until the path of ionized gas is broken (e.g., due to erosion of the conducting electrodes or widening of the gap) or the potential difference is reduced below the breakdown voltage. This usually happens when the voltage drops, but in some cases occurs when the heated gas rises, stretching out and then breaking the filament of ionized gas. Usually, the action of ionizing the gas is violent and disruptive, often leading to sound (e.g., ranging from a snap for a spark plug to thunder for a lightning discharge), light, and heat. Spark gaps were used historically in early electrical equipment, such as spark gap radio transmitters, electrostatic machines, and X-ray machines. Their most widespread use today is in spark plugs to ignite the fuel in internal combustion engines, but they are also used in lightning arresters, gas discharge tubes and other devices to protect electrical equipment from high-voltage transients.

In spark gaps used to protect electrical circuits from electrical surges, such as circuits on printed circuit boards, an input on the circuit board is typically connected via a first trace to a spark gap and via a second trace to a capacitor, where an opposite end of the capacitor is connected to an output that may in turn be connected to an electrical circuit. The capacitor may be configured to block direct current (DC) and/or to prevent surges from reaching the output and any electrical components connected thereto. The spark gap may include a first terminal connected to the input and a second terminal connected to ground, with an air gap between the first terminal and the second terminal. The terminals may be formed as metallic traces on the printed circuit board. The spark gap may allow a voltage surge to cause a spark that jumps across the gap between the terminals to be shunted to the ground to protect the capacitor and any electrical circuit connected to the output. However, in such a spark gap, if the surge that causes the spark to jump across the gap (known as the spark over voltage or dielectric breakdown voltage) is too large, the capacitor and/or any components or electrical circuits connected to the output may be damaged.

It may be desirable to provide a spark gap for a printed circuit board that has a lower spark over voltage to better protect the capacitor and any circuit connected to the output. Additionally, these spark gaps may be deployed in high voltage/broadband RF circuits such as CATV line splitters and other products. In this case, the spark over voltage would have to be controlled to have a low limit ensuring adequate isolation for the line voltage, e.g., 90 Vrms.

SUMMARY

A spark gap device is configured to provide an enhanced spark over voltage. The spark gap device includes a printed circuit board, an input configured on the printed circuit board and configured to receive signals, a non-smooth textured substrate surface configured to be disposed on a surface of the printed circuit board, a spark gap configured on the printed circuit board, the spark gap comprising: a first conducting electrode connected to the input, a second conducting electrode configured to be grounded, a gap having an exposed surface of the substrate configured to be disposed between the first and second conducting electrodes, and a conductive material configured to be disposed in a non-continuous and irregular manner on the non-smooth textured substrate surface and between the first and second conducting electrodes, an output configured on the printed circuit board, a capacitor configured to connect between the input and the output, a conductive material configured in a non-continuous and irregular manner on the non-smooth textured substrate surface and between the first and second conducting electrodes, and wherein the spark gap is structurally configured to provide an enhanced spark over voltage to the spark gap device to protect the capacitor and/or an external device connected to the output.

A spark gap device is configured to provide an enhanced spark over voltage so as to protect an electronic device connected to the spark gap device. The spark gap device includes a printed circuit board, a non-smooth textured substrate surface configured to be disposed on a surface of the printed circuit board, a spark gap configured on the printed circuit board, the spark gap comprising: a first conducting electrode, a second conducting electrode, a gap having an exposed surface of the substrate configured to be disposed between the first and second conducting electrodes, and a conductive material configured to be disposed in a non-continuous and irregular manner on the non-smooth textured substrate surface and between the first and second conducting electrodes, and wherein the spark gap is structurally configured to provide an enhanced spark over voltage to the spark gap device to protect an external device connected to the spark gap device.

A spark gap is structurally configured to provide an enhanced spark over voltage. The spark gap includes a non-smooth textured substrate surface, a first conducting electrode, a second conducting electrode, a gap configured to be disposed between the first and second conducting electrodes, and a conductive material configured to be disposed in a non-continuous and irregular manner on the non-smooth textured substrate surface and in the gap between the first and second conducting electrodes, wherein the spark gap is structurally configured to provide an enhanced spark over voltage to protect any device connected to the spark gap.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

A spark gap device for a printed circuit board and other applications is described herein. In one embodiment, the spark gap may be used to protect a capacitor and/or circuits connected to the output, such as cable television (CATV) circuits or other elements, multimedia over coax alliance (MoCA) circuits, Ethernet circuits or a combination thereof. However, as will be appreciated, the spark gap for a printed circuit board may be used to protect other types of circuits as well. The spark gap(s) in the circuit may be constructed of specific materials and to specific dimensions as described herein such that they can effectively enhance performance of the spark gap device, as further described herein.

Figure 1:
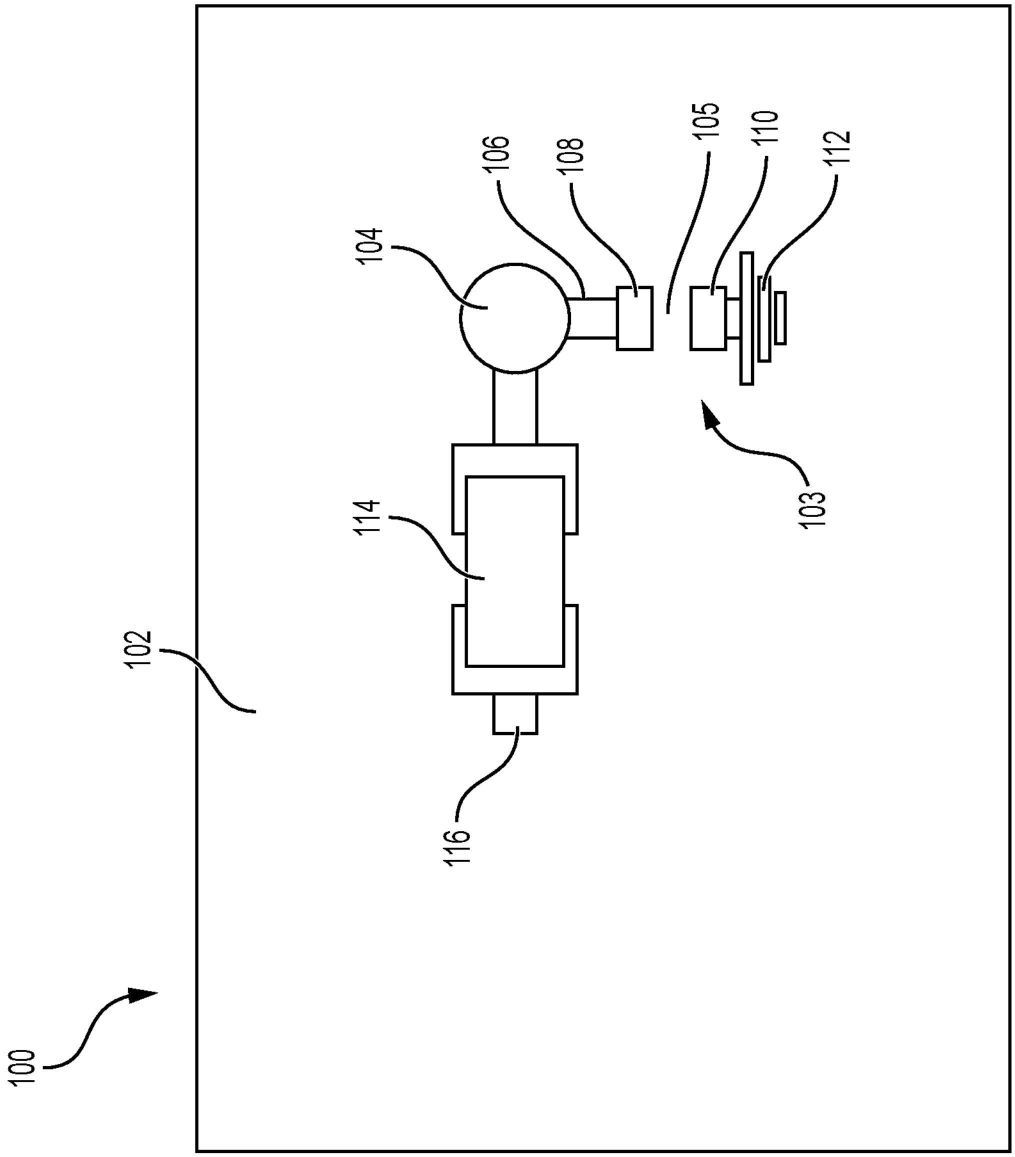
FIG. 1 illustrates a schematic view of a spark gap device formed on a printed circuit board according to various embodiments.

FIG. 1 illustrates a schematic view of a spark gap device 100. In some embodiments, the spark gap device 100 may be formed on a printed circuit board 102. The printed circuit board 102 may be substantially planar and may include layers typically found on a conventional printed circuit board.

The spark gap device 100 may also include an input 104 that is connected to the circuit board 102. The input 104 may be configured to be connected to a cable or a device. In some embodiments, the input 104 may be configured to be connected to a CATV headend, although any other types of signals may be used. In some embodiments, the input 104 may be configured to receive CATV signals (e.g., from the CATV headend).

The spark gap device 100 may also include a spark gap 103 that is connected to the circuit board 102 and to the input 104. The spark gap 103 may be configured to prevent electrical surges from passing from the input 104 to an output 116, or vice versa. The spark gap 103 may include a first electrode 108 and a second electrode 110 separated by a gap 105. The electrodes 108, 110 may be made from a conductive material such as metal. The electrodes 108, 110 may extend in a direction that is substantially perpendicular to the circuit board 102. The electrodes 108, 110 may be formed at an end of traces 106 formed on the circuit board 102. The gap 105 may consist of the exposed surface of the substrate upon which the electrodes (terminals) are bonded. The substrate may have a material such as FR4 (a glass-reinforced epoxy resin laminate used on printed circuit boards), a ceramic material or another similar material on an outer surface thereof. In some embodiments, the material on the substrate may be any material with a non-smooth textured surface.

A ground 112 may be connected to terminal 110. A capacitor 114 may be connected to the input 104. The output 116 may be connected to the opposite end of the capacitor 114 from the input 104. The output 116 may be connected to other circuits, which in some embodiments may be formed on the printed circuit board 102. Alternatively, the other circuits that the output is connected to may not be on the circuit board 102.

Figure 2:
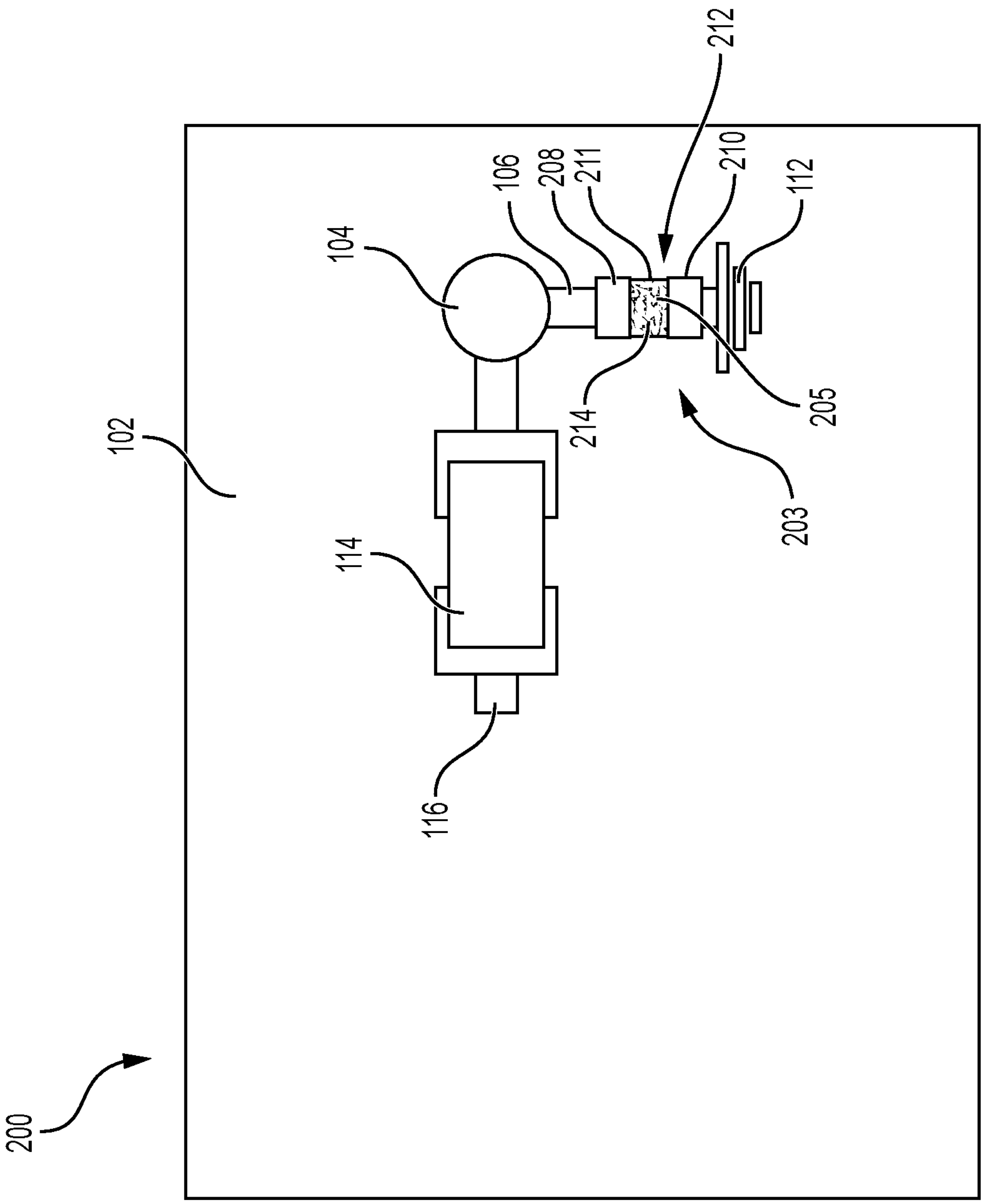
FIG. 2 illustrates a schematic view of a spark gap device formed on a printed circuit board according to various embodiments.

FIG. 2 illustrates a spark gap device 200 in accordance with various embodiments. The spark gap device 200 has many of the same elements as the spark gap device 100, which like elements have like reference numerals. The spark gap device 200 also includes spark gap 203 with a first terminal 208 connected to the input 104 and a second terminal 210 connected to ground 112. The terminals 208, 210 are separated by a gap 212. Adjacent to the gap 212 on the printed circuit board 102 is a non-smooth textured surface 211, which may be FR4, a ceramic material, or another material with a non-smooth textured surface. A conductive material 214 may be irregularly disposed or doped on the non-smooth textured surface 211 within the gap 212.

Figure 3:
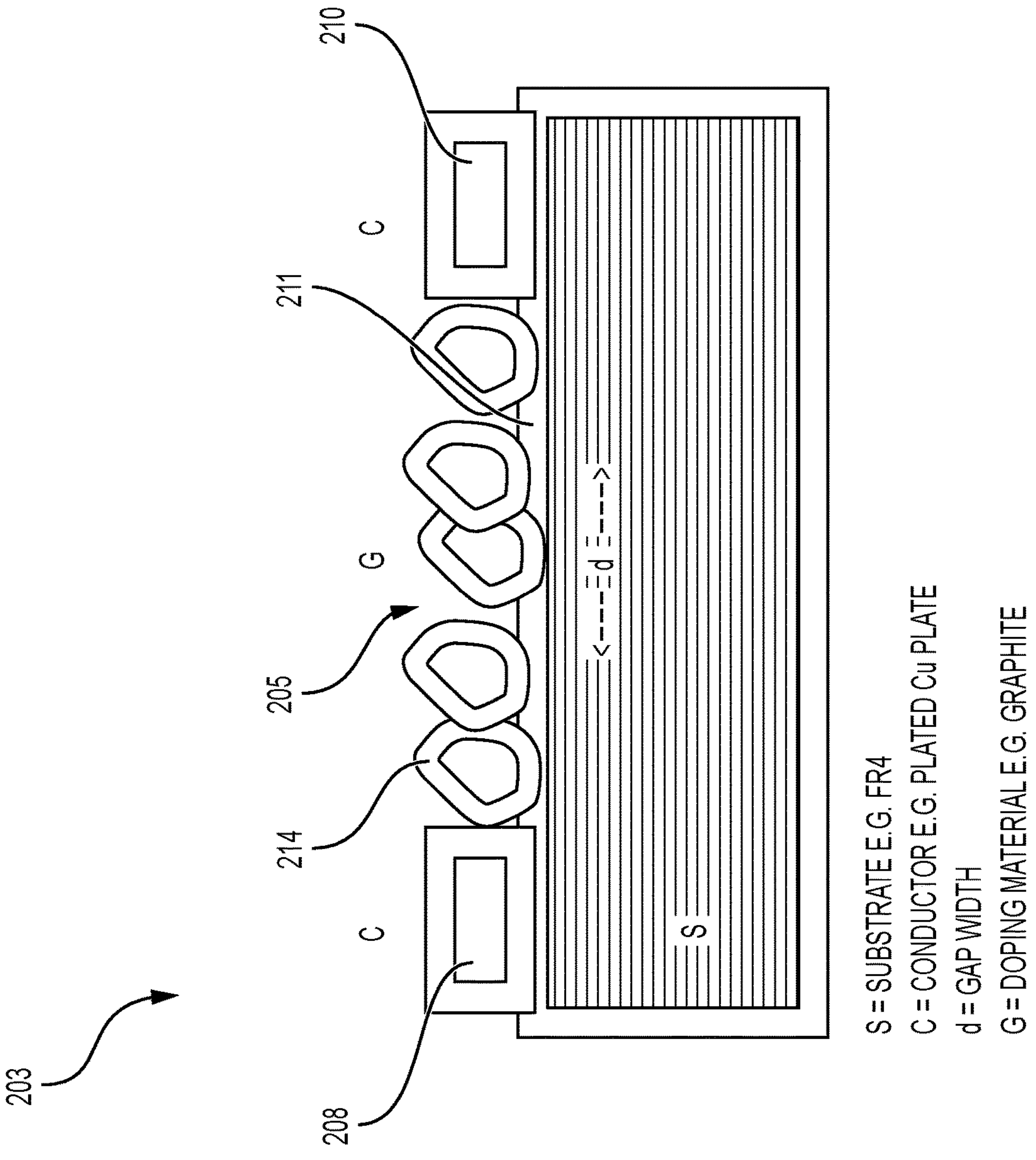
FIG. 3 illustrates a schematic view of a spark gap formed on a printed circuit board according to various embodiments.

The spark gap device 200 is configured to protect circuits from transient voltages and surges while protecting 1) the capacitor 114 and any output circuit (Upper Limit e.g., 2 KV) connected to the output 116 as well as 2) the system operating voltages at the input from shorting to ground e.g., 90 Vrms Line Passives/Amps or 48 Vdc Power over ethernet, etc. (Lower Limit e.g., 500V). FIG. 3 illustrates the spark gap 203 in further detail. The spark gap 203 includes the terminals 208, 210 separated by gap 205. The conductive material 214 is doped onto the non-smooth textured surface 211. The conductive material 214 is doped or disposed on the non-smooth textured surface 211 such that individual particles of the conductive material 214 are disposed on the non-smooth textured surface 211 in a non-continuous and non-uniform manner such that the conductive particles form a semi-conducting layer within the gap 205.

The conductive particles of the conductive material 214 may be formed from various conductive materials. For example, in some embodiments, the conductive material 214 may be graphite, although other conductive materials may be used, such as aluminum, zinc, etc. The particles of the conductive material 214 may be applied to the non-smooth textured surface 211 in various ways, such as spray coating. In some embodiments where the conductive particles of the conductive material are graphite, the graphite particles may be applied by rubbing a pencil, such as a #2 pencil over the non-smooth textured surface 211. In some embodiments, the conductive particles may be graphite particles applied from pencil grade graphite of 4B to 4H grade (nominal).

In some embodiments, the conductive material 214 may be applied to the non-smooth textured surface 211 between the electrodes 208, 210 with light to moderate surface pressure and back-and-forth strokes. In some embodiments, the non-smooth textured surface 214 may be an undoped FR4 surface (with gaps between graphite particles). The graphite particle coverage must not have undoped regions ≥4 mil wide and a length greater than the length of the conductors. Excess graphite powder may be removed with cloth or swab.

The irregularly disposed particles of the conductive material 214 in the gap 205 are used in various embodiments to enhance the performance of the spark gap device 200. In various embodiments, the spark gap device 200 provides an enhanced spark over voltage, as well as other enhanced performance, as further discussed herein.

Various objectives and benefits achieved by the spark gap device 200 include:

1) Exposed conductor (electrode) clearances greater than required by the following safety standards: IPC2221B, IPC9592B, UL60950, UL497B.
2) Set Vb (breakdown voltage) and tolerance between the maximum DC operating voltage and below the voltage rating of the series blocking capacitor (for Broadband RF circuits).
   a. Example:
      i. Given a CATV Line Splitter with 90 Vrms (128Vpeak) and a 2 KV rated blocking capacitor
      ii. Want Vb to be (128V+2000V)/2=1064V±500V with a conductor clearance of >24 mil
      iii. Would choose a Spark Gap d>=25 and Dope the Gap with Graphite #2 or similar
3) Minimize Shunt Capacitance <<0.5 pF to minimize degradation to Broadband Return Loss and Insertion Loss
4) Achieve Surge Withstand greater than necessary for testing in accordance with IEEE C 62.41 Cat. B3 Ring Wave per SCTE 81 500V to 6000V 12Ω 0.5 uS Surge. E.g., Target 3 times as many surge events or 96 events.
5) Achieve Surge Withstand greater than necessary for testing in accordance with IEEE C 62.41 Cat. B3 Combo Wave per SCTE 81 500V to 6000V 2Ω 1.2/50 uS-8/20 uS Surge. E.g. Target 3 times as many surge events or 96 events.

The spark gap devices were tested IAW the following:

a. IEEE C 62.41 Category A3 Ring Waveform as specified by SCTE 81 2012
   i. 6 kV 200 A 30 Ohm Standard 0.5 uS Ring Wave Surge
   ii. #Incremental Events
b. IEEE C 62.41 Category B3 Ring Waveform as specified by SCTE 81 2012
   i. 6 kV 500 A 12 Ohm Standard 0.5 uS Ring Wave Surge
   ii. #Incremental Events
c. IEEE C 62.41 Category B3 Combination Waveform as specified by SCTE 81 2012
   i. 6 kV 3 kA 2 Ohm Standard 1.2/50 uS-8/20 uS Combo Wave Surge
   ii. #Incremental Events Spark gap devices without doping of the conductive material with 0.005" gaps resulted in a very high spark over (breakdown) voltage range with undesirably high spark over voltages of 2500V+/−1000V with circuits with 2 KV or lower rated blocking capacitors failing surge testing. In contrast, spark gap devices with doping of the conductive material with 0.020" to 0.025" gaps resulted in spark over voltages of 1000V+/−500V such that circuits with 2 KV rated blocking capacitors are protected during surge testing using 6 KV/500 Amp testing with 96 spark overs. Additionally, high voltage or 90 Vrms have adequate isolation from ground.

Table 1 illustrates measured breakdown voltage for doped and undoped spark gaps with various gap widths. The high breakdown voltages of the undoped spark gaps result in damage to the capacitor and/or any circuits connected to the output.

TABLE 1

Measured Breakdown Voltage Data for various Spark Gaps (Doped and Un-Doped)

| | Dielectric Breakdown Voltage | | | | | Doped |
|---|---|---|---|---|---|---|
| $D_{Gap}$ | 5 | 10 | 20 | 25 | 30 | mils |
| Vb Avg | 2,522 | | 2,650 | 2,675 | | none |
| Vb STDev | 366 | | 238 | 427 | | none |
| Vb Avg | 200 | 200 | 863 | 1,108 | 1,400 | Graphite #2 |
| Vb STDev | 0 | 0 | 535 | 444 | 141 | Graphite #2 |

Figure 9:
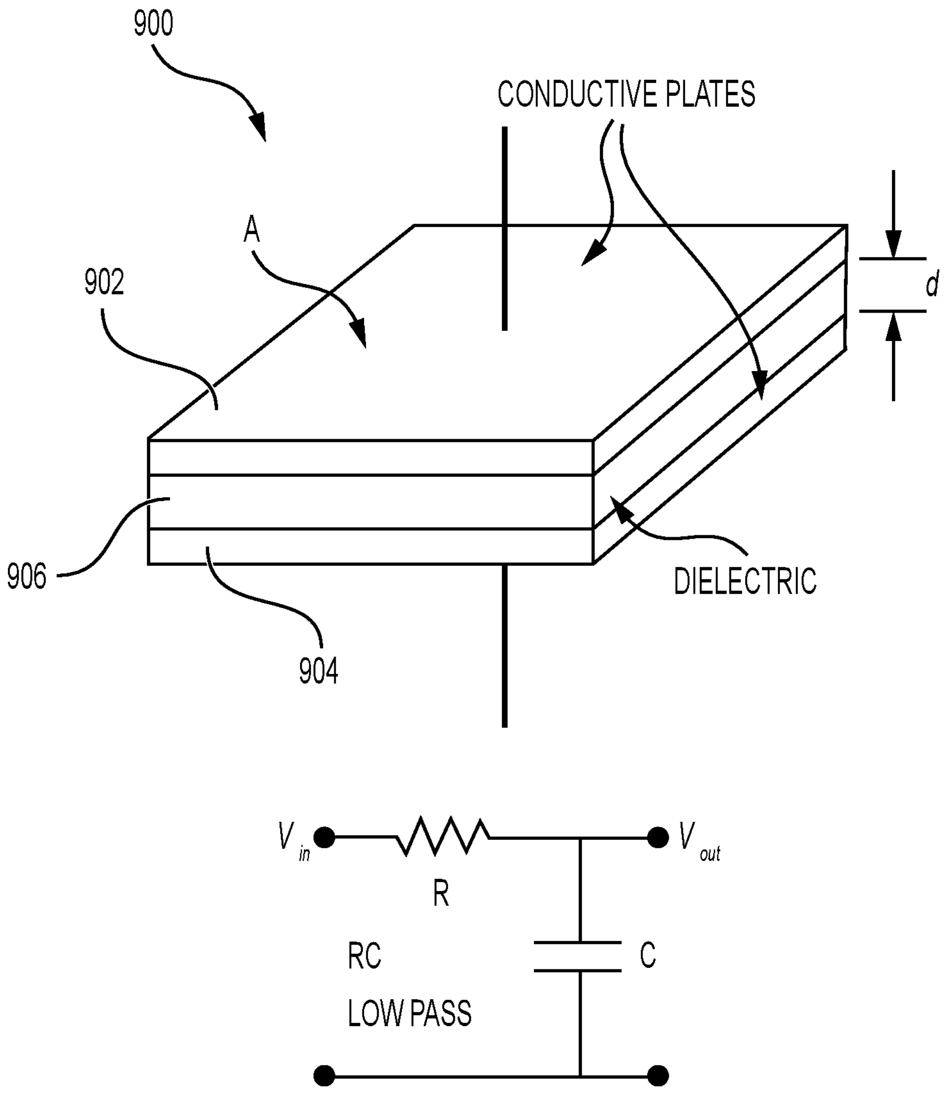
FIG. 9 illustrates a spark gap according to various embodiments.

The following shows dielectric breakdown for parallel plate conductors of a spark gap 900 with conductors 902 and 904 and dielectric 906 as illustrated in FIG. 9.

Dielectric Breakdown Voltage for Parallel Plate (conductors):

$$Vb = D * Eds,\ Eds = Vb/D$$

Vb=Breakdown Voltage, also known as Strike Voltage Breakdown; The protector specified surge waveform lowest voltage at which dielectric breakover occurs. Typically observed as an arc between conductors, a snapping noise, or an impulse voltage on an oscilloscope.

D=Distance between conductive plates (electrodes) in mils (inches/1000)

Eds=E field strength in volts per meter at which breakdown occurs is an intrinsic property of the insulating material called its dielectric strength Doped=Conductive particles added to substrate surface within the Gap area Observations from Vb equations and the Spark Gap data in table 1:

1) D increases, Vb increases
2) Eds for Gap Doped with Graphite #2<<Eds for Gap Un-Doped
3) Vb for Gap Doped with Graphite #2<<Vb for Gap Un-Doped
4) Nominal Spark Gap: d=25 mil moderately doped with graphite; Vb 1108V±444V (from data table 1).

Parallel Plate Capacitance:

$$C=K*\varepsilon o*A/d, \text{ where } \varepsilon o=0.2248 \text{ (imperial)}$$

A=Conductor or Electrode surface area

K=εr=ε/εo is the dielectric constant of the material Air=1, Graphite=10, Fr4=4.5

εr=relative permittivity

ε=absolute permittivity

εo=vacuum permittivity d is the distance between the plates

C is capacitance

Observations for capacitance calculations:

1) C increases when d decreases or A increases or εr increases
2) A Spark Gap may be represented by a shunt capacitance in a Broadband circuit.
3) Doping the SG Gap with Graphite increases the effective dielectric εreff, increasing the shunt capacitance and degrading the broadband Insertion Loss and Return Loss. It is desirable to keep C<<0.5 pF
4) Reducing the SG Gap parallel plate (conductor) distance d or increasing the surface area A increases the shunt capacitance degrading the broadband Insertion Loss and Return Loss. It is desirable on an FR4 substrate to keep d>>0.005 in. and A/d<<0.0025 sqin., C=4.5*0.2248*(0.0025 sqin./0.005 in.)=0.5 pF
5) The reason the circuit Return Loss and Insertion Loss are negatively impacted by the spark gap effective shunt capacitance is because the spark gap forms a Low Pass Filter LPF path to ground (diagram above).

Figure 4A:
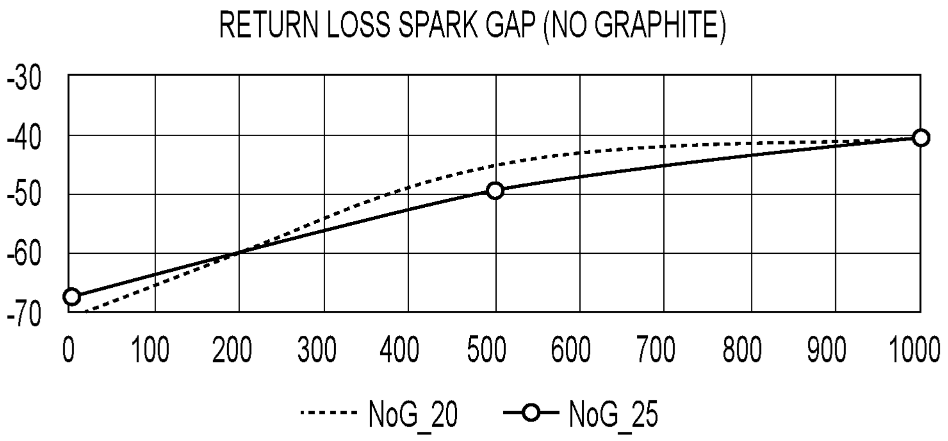
FIG. 4A-4C illustrate return loss of the spark gap device with no graphite doping, with moderate graphite doping and with excess graphite doping.
Figure 4B:
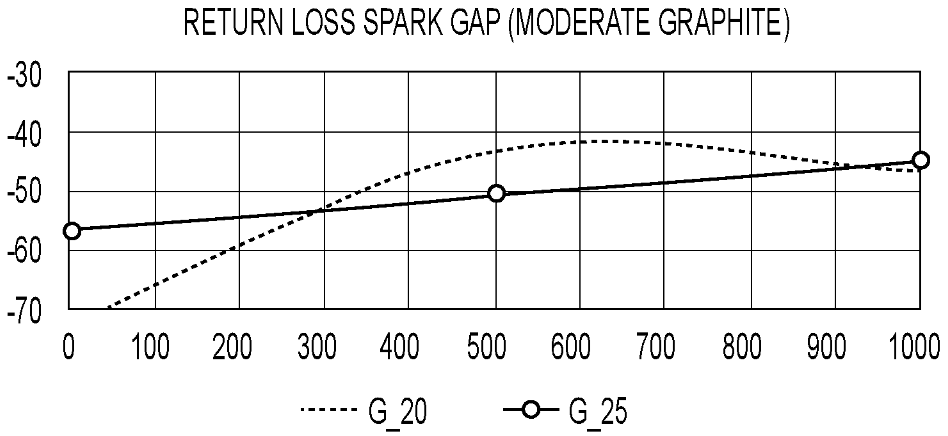
Figure 4C:
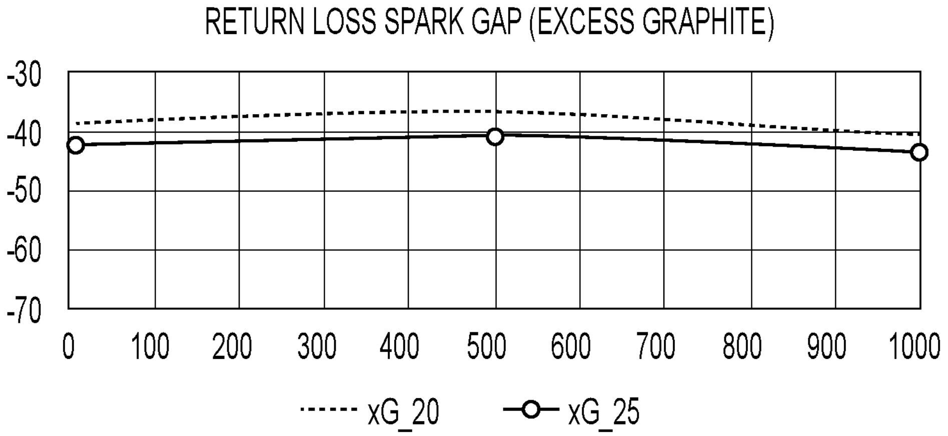

FIGS. 4A-4C illustrate return loss of the spark gap device with no graphite doping, with moderate graphite doping and with excess graphite doping. Table 2 shows return loss measured results with a 20 mil spark gap and a 25 mil spark gap. These results show that the return loss is not degraded with a moderate graphite doping, the return loss is degraded with an excessive graphite doping, and the return loss is marginally better with a 25 mil gap than a 20 mil gap.

TABLE 2

| | No Graphite | Moderate Graphite | Excess Graphite | |
|---|---|---|---|---|
| | Return Loss: Spark Gap d = 20 mil | | | |
| 5 MHz | −70.73 | −72.31 | −38.31 | dB |
| 500 MHz | −45.32 | −43.31 | −36.41 | dB |
| 1000 MHz | −40.91 | −46.58 | −40.63 | dB |
| | Return Loss: Spark Gap d = 25 mil | | | |
| 5 MHz | −67.78 | −57.05 | −42.51 | dB |
| 500 MHz | −49.42 | −50.62 | −40.64 | dB |
| 1000 MHz | −40.18 | −45.11 | −43.54 | dB |

Figure 5:
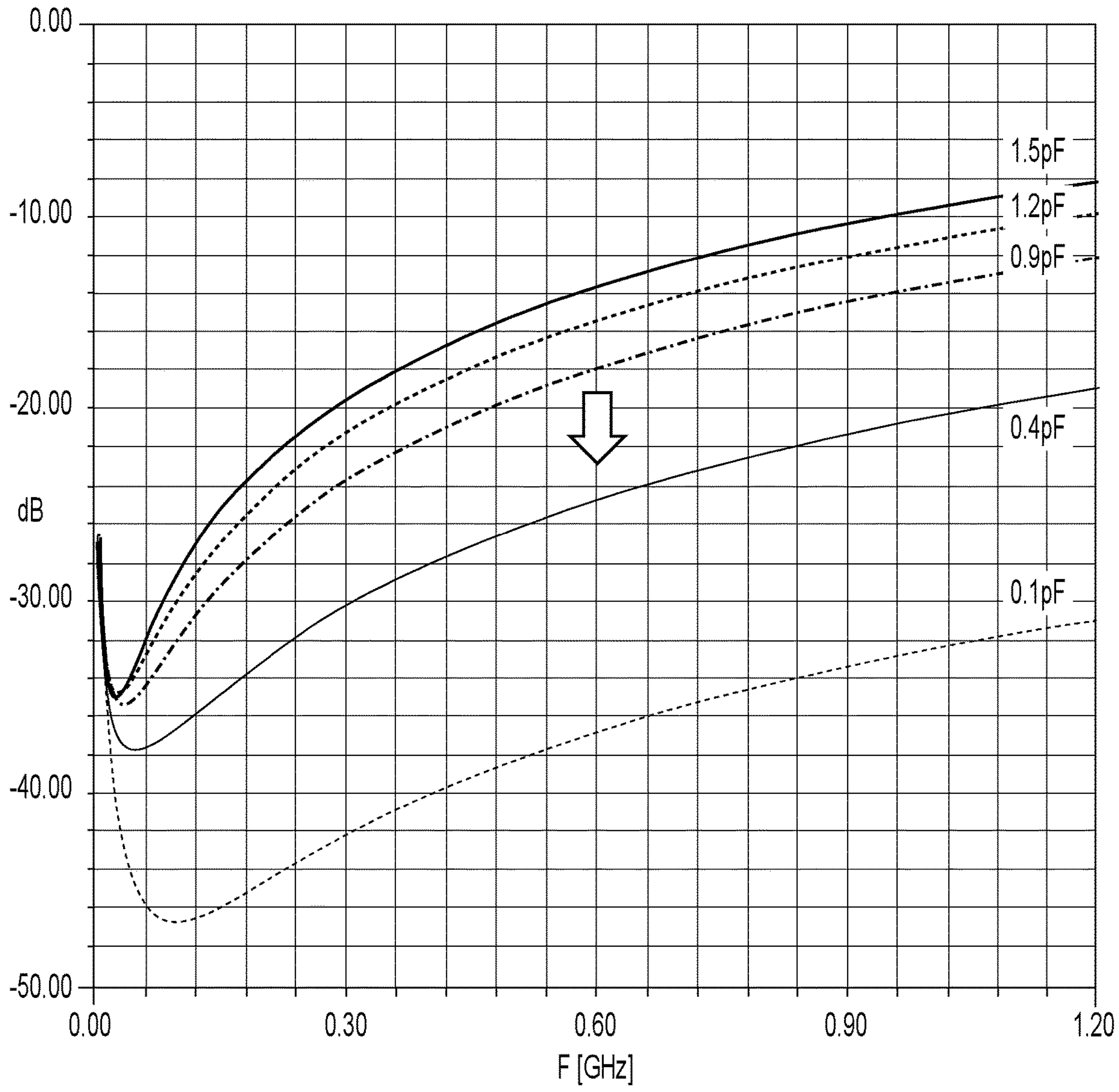
FIG. 5 illustrates broadband return loss for progressive values of spark gap equivalent capacitance according to various embodiments.

FIG. 5 illustrates broadband return loss in dB for progressive values of spark gap equivalent capacitance of 0.1 pF to 1.5 pF at different frequencies. The curves are for 0.1 pF, 0.4 pF, 0.9 pF, 1.2 pF and 1.5 pF from bottom curve to top curve. The spark gap's effective shunt capacitance impact on the return loss of a capacitively coupled circuit is shown, with a return loss target of <−18 dB.

Figure 6:
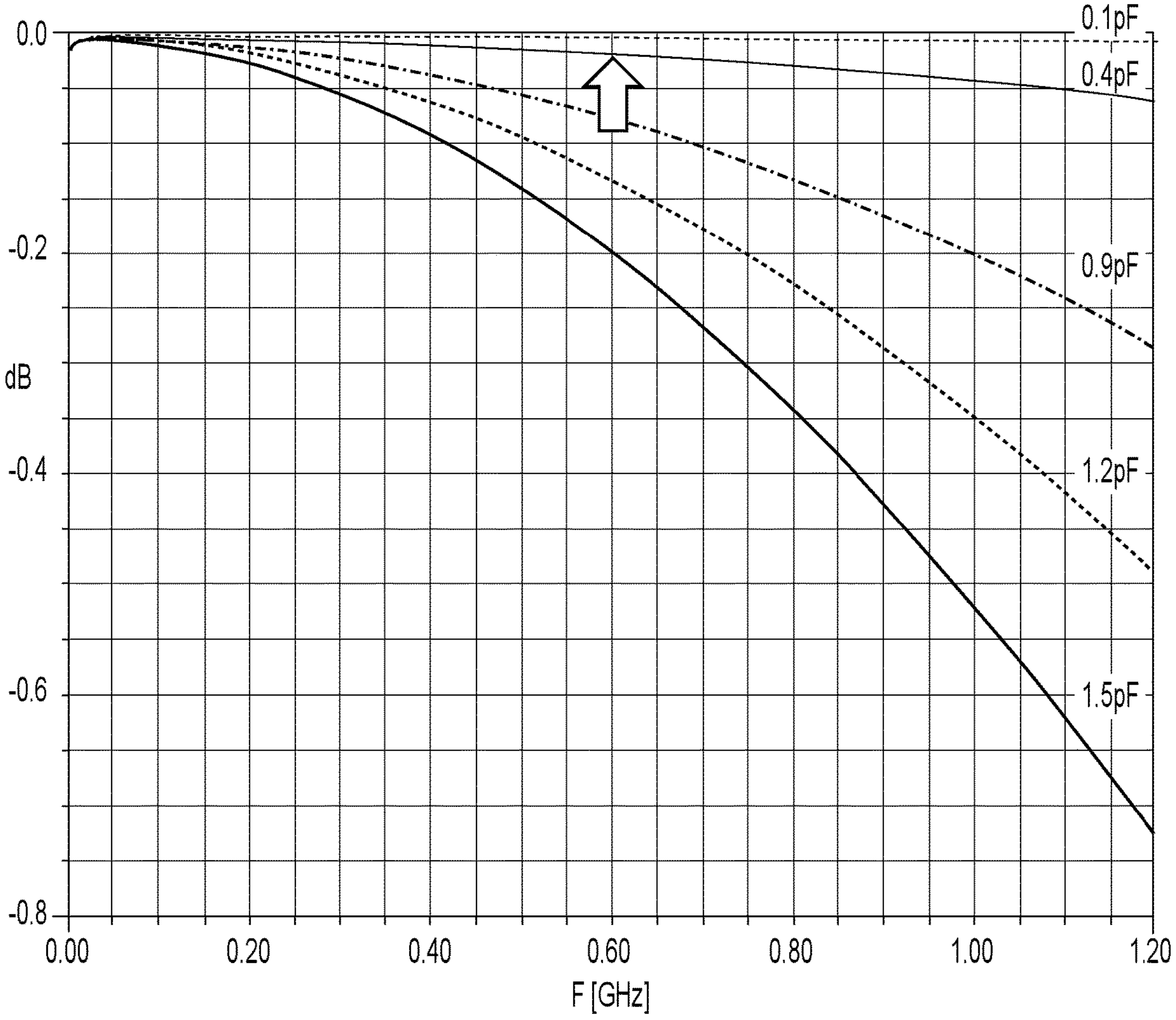
FIG. 6 illustrates broadband insertion loss in dB for progressive values of spark gap equivalent capacitance according to various embodiments.

FIG. 6 illustrates broadband insertion loss in dB for progressive values of spark gap equivalent capacitance of 0.1 pF to 1.5 pF at different frequencies. The curves are for 0.1 pF, 0.4 pF, 0.9 pF, 1.2 pF and 1.5 pF from the top curve to the bottom curve. The spark gap's effective shunt capacitance impact on the insertion loss of a capacitively coupled circuit is shown, with an insertion loss target of >−0.1 dB.

Figure 7:
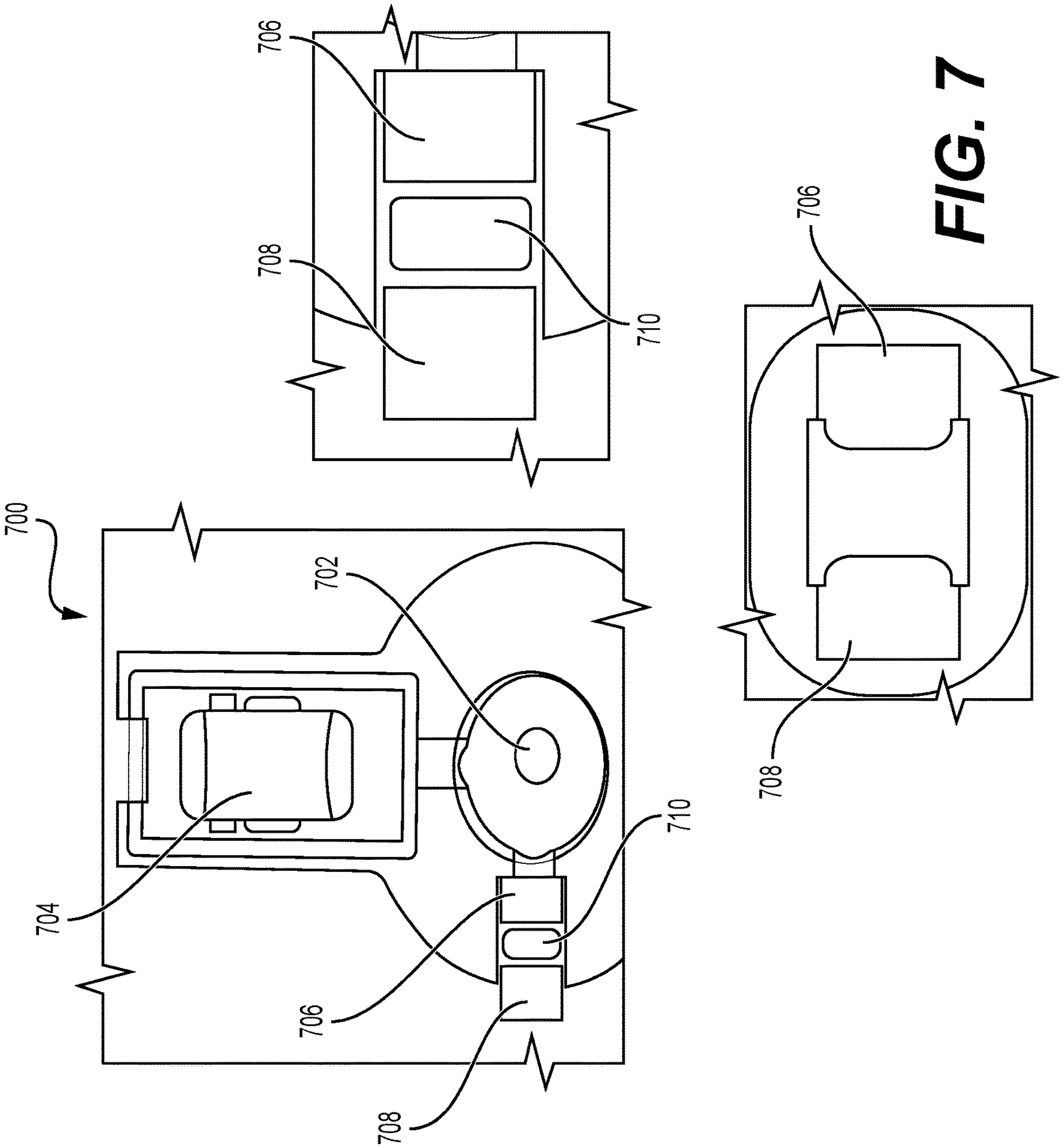
FIG. 7 illustrates a spark gap device according to various embodiments.

FIG. 7 illustrates a spark gap device 700 with a gap of d=0.025" doped with a moderate amount of graphite #2 710, conductor terminals 706, 708 of 0.040"×0.025". The spark gap is connected to input 702, which is connected to capacitor 704. The middle illustration of FIG. 7 shows the spark gap doped before surge testing, and the right illustration of FIG. 7 shows the spark gap after 96 events of IEEE C 62.41 Cat. B3 Ring Wave 6000V/500 A 12Ω 0.5 uS Surge (>3× the SCTE 81 requirement). This Spark Gap configuration successfully protects the circuit from Ring Wave however Combo Wave would require substantially larger or thicker conductors.

Figure 8:
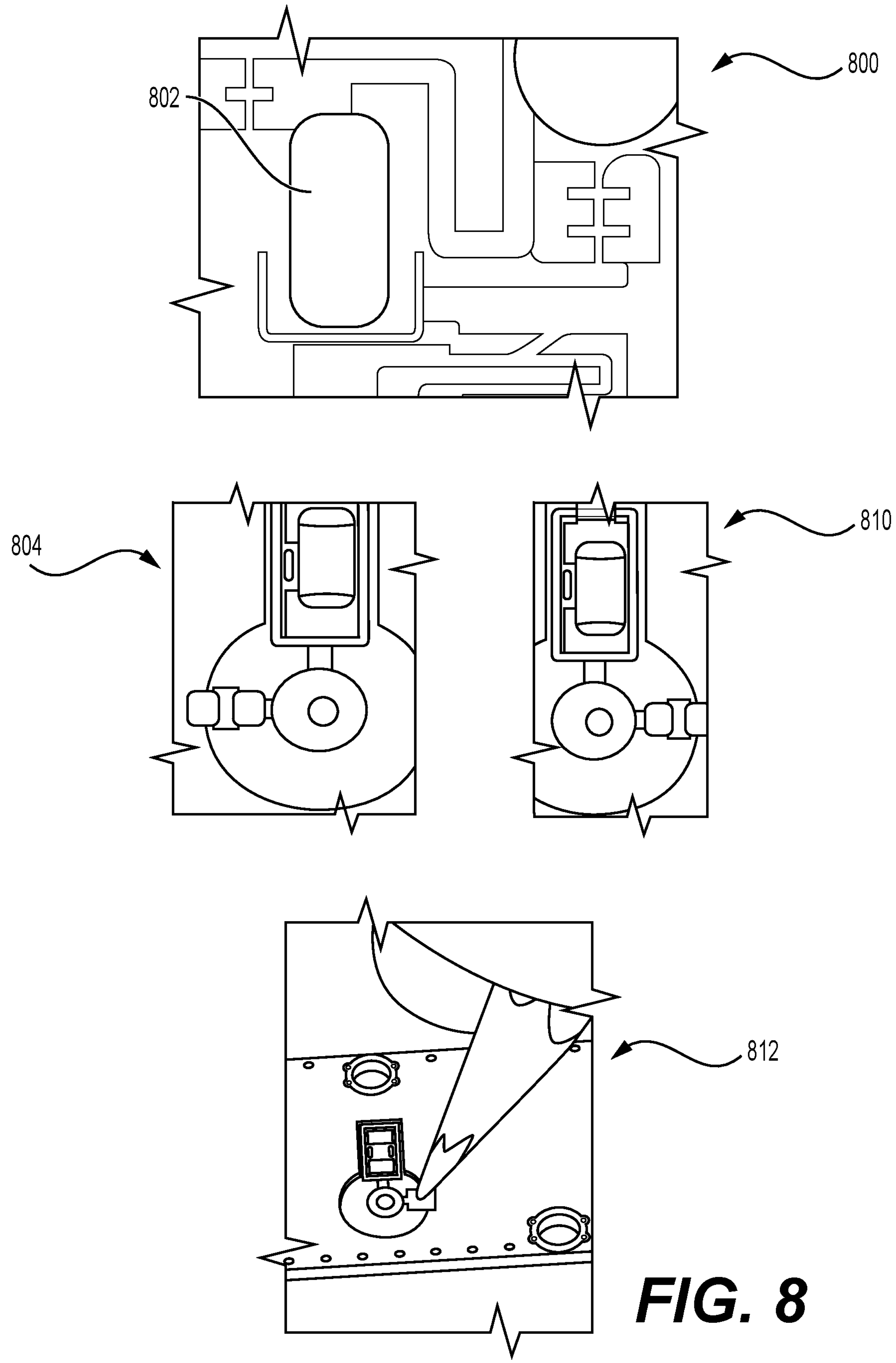
FIG. 8 illustrates a spark gap device according to various embodiments.

FIG. 8 illustrates a spark gap device 800 with a gap of 0.005" with no graphite doping that has failed the ring wave surge test with less than 10 events as shown by the damaged capacitor 802. Spark gap device 804 has a gap of 0.025" with graphite covered with flux that has passed the ring wave surge test with much greater than 10 events. Spark gap device 810 has a gap of 0.025" with graphite doping covered and cleaned with acetone that has passed the ring wave surge test with much greater than 10 events. Spark gap device 812 is being doped by hand with a number 2 pencil.

The spark gaps doped with graphite have a greater effect on the reduction of the dielectric breakdown voltage than the increase in shunt capacitance (|C|<<|Vb|). Thus, doped spark gaps more effectively protect the circuit from transient voltages (surges) without degrading the broadband RF performance. The reduced dielectric strength Eds of the spark gaps doped with graphite provides a more reliable dielectric breakdown voltage Vb in the presence of excess soldering flux or contaminates. The adhesion of the graphite while exposed to brushing with solvents is very robust and continues to ensure circuit protection (image 3). Graphite may be applied to the printed circuit substrate very easily with minimal manufacturing controls e.g. there is a broad range of graphite doping from minimal to high moderate for which all improve circuit protection while minimizing impact on broadband performance.

Figure 10:
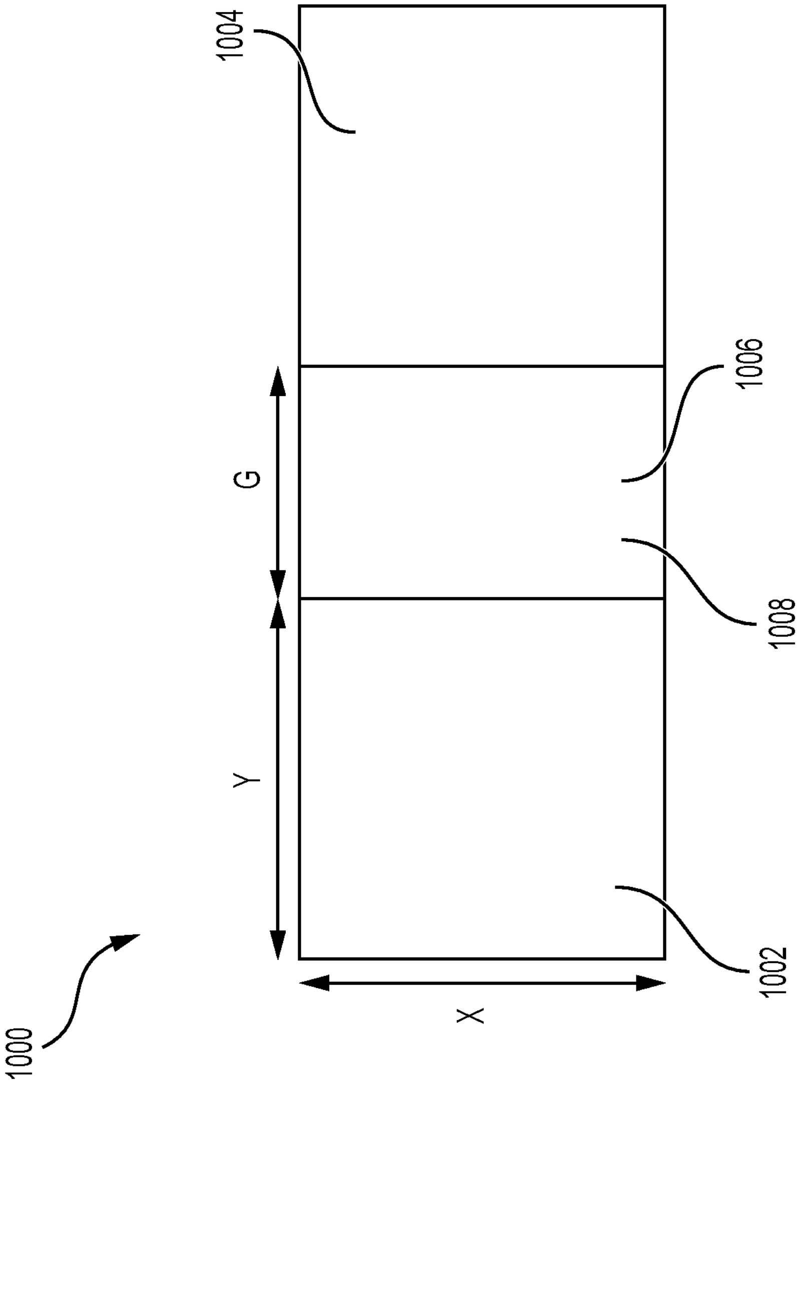
FIG. 10 illustrates a ring wave spark gap according to various embodiments.

FIG. 10 illustrates a ring wave spark gap 1000 (surge protector) in accordance with various embodiments. In some embodiments, the spark gap 1000 may be configured to be used with a printed circuit board in the same manner as in FIGS. 1-8. The spark gap 1000 may include parallel conductors 1002, 1004 separated by a gap 1006. The conductive material 1008 is in the gap 1006 in a non-continuous manner. The conductive material 1008 may be graphite as previously described herein.

TABLE 3

| Single Sided | | | |
|---|---|---|---|
| | PAD | | |
| | X | Y | Z |
| MIN: | 0.040" | 0.055" | 0.00137" |
| MAX: | 0.080" | 0.065" | 0.00274" |
| | GAP G | | |
| MIN: | 0.0240" | | |
| NOM: | 0.0265" | | |
| MAX: | 0.0290" | | |

In a particular design configuration, the spark gap 1000 may be used on an FR4 substrate with copper clad conductors 1002, 1004 with conductive plating of either; HASL, LFHASL, ENIG, IAg, ISn, or ENEPIG. The dimensions of the spark gap 1000 may be as set forth in the following table 3 and produce breakdown voltage and surge withstand as noted herein.

Figure 11:
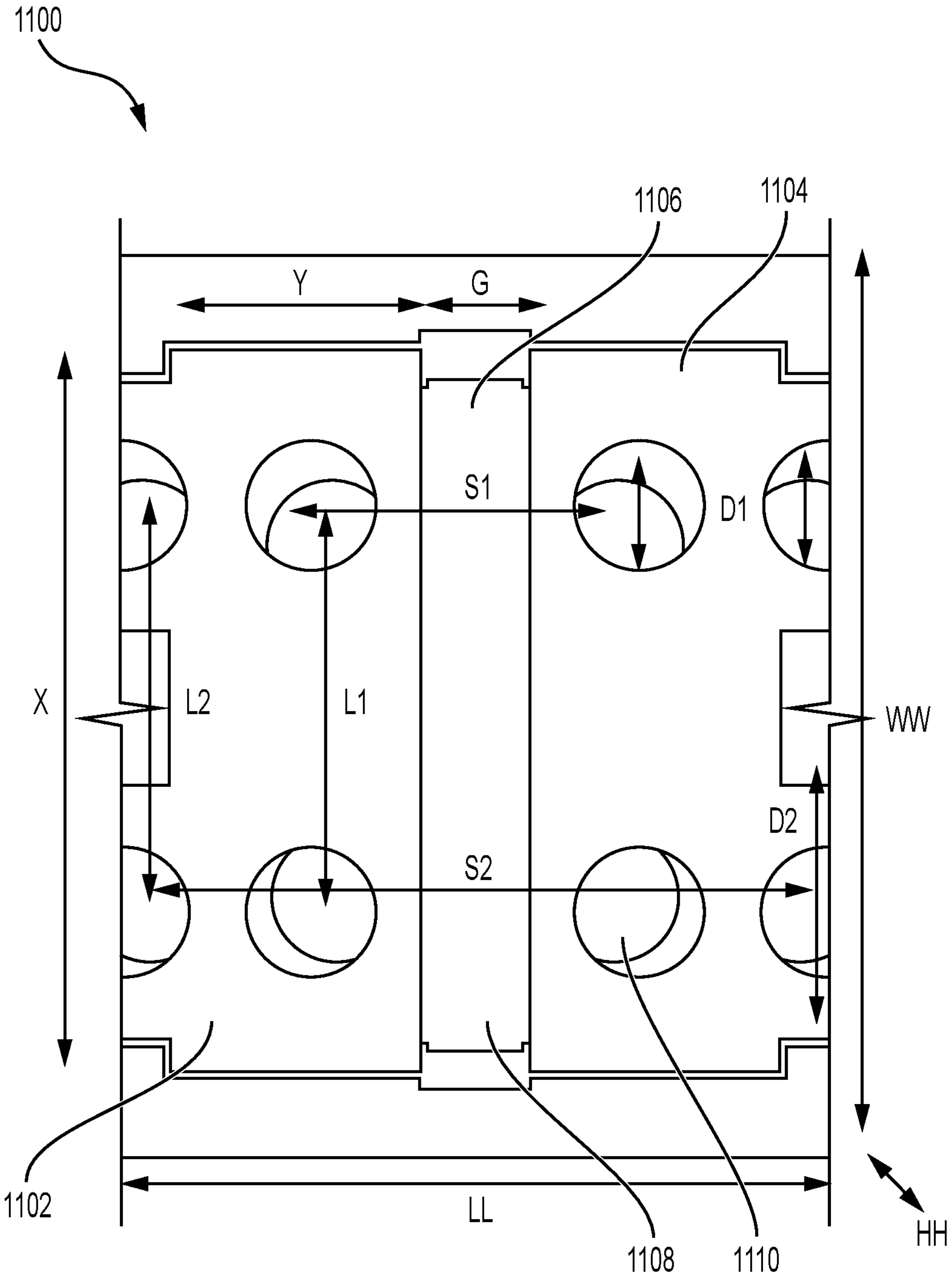
FIG. 11 illustrates a combo wave spark gap according to various embodiments.

FIG. 11 illustrates a combo wave spark gap 1100 (surge protector) in accordance with various embodiments. In some embodiments, the spark gap 1100 may be configured to be used with a printed circuit board in the same manner as in FIGS. 1-8. The spark gap 1100 may include parallel conductors 1102, 1104 separated by a gap 1106. The conductive material 1108 is in the gap 1106 in a non-continuous manner. The conductive material 1108 may be graphite as previously described herein. The combo wave spark gaps require additional conductor mass to meet a surge withstand capacity of up to 96 events, which may be provided by conductive tabs connected to each conductor 1102, 1104 or by connecting conductive wires to the through holes 1110 on the conductors 1102, 1104.

TABLE 4

| | PAD | | |
|---|---|---|---|
| | X | Y | Z |
| MIN: | 0.150" | 0.055" | 0.00137" |
| MAX: | 0.200" | 0.065" | 0.00274" |
| | GAP | | |
| | G | S2 | |
| MIN: | 0.0240" | 0.167" | |
| NOM: | 0.0265" | 0.172" | |
| MAX: | 0.0290" | 0.177" | |
| | PCB | | |
| | LL | WW | HH |
| NOM: | 0.172" | 0.221" | 0.044" |
| | PTH/PAD | | |
| | D1 | D2 | L2 |
| NOM: | 0.0315" | 0.060" | 0.100" |

In a particular design configuration, the spark gap 1100 may be used on an FR4 substrate with copper clad conductors 1002, 1004 with conductive plating of either; HASL, LFHASL, ENIG, IAg, ISn, or ENEPIG. The dimensions of the spark gap 1100 may be as set forth in the following table 4 and produce breakdown voltage and surge withstand as noted herein.

Figure 12:
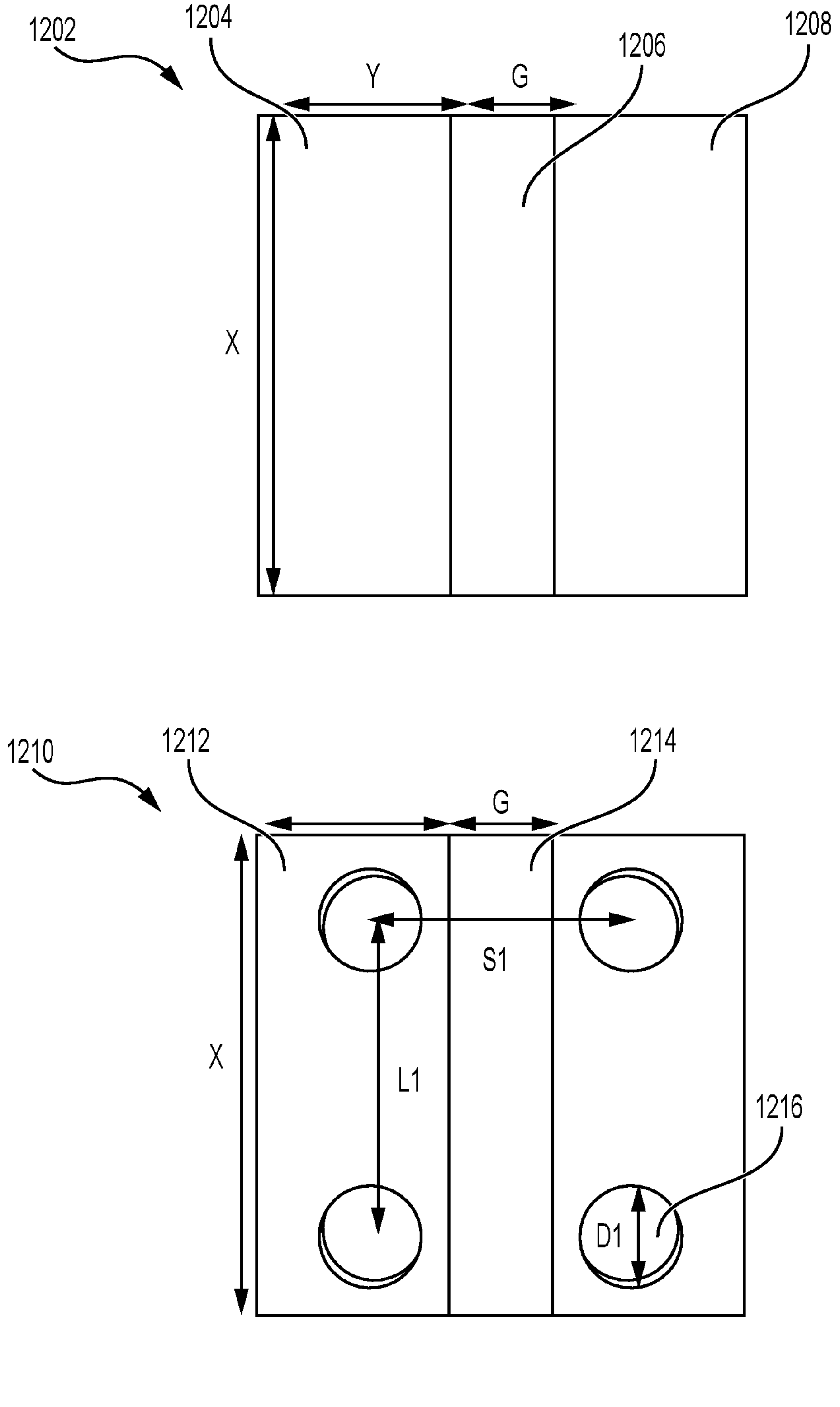
FIG. 12 illustrates a spark gap according to various embodiments.

FIG. 12 illustrates spark gaps 1202 and 1210. The spark gap 1202 has conductors 1204 and 1208 separated by gap 1210. The spark gap 1210 has conductors 1212 separated by gap 1214 and through holes 1216. The through holes 1216 may be used to attach conductive wires to each conductor 1210 to add conductive mass to the conductors 1212. Table 4 illustrates possible dimensions.

Figure 13:
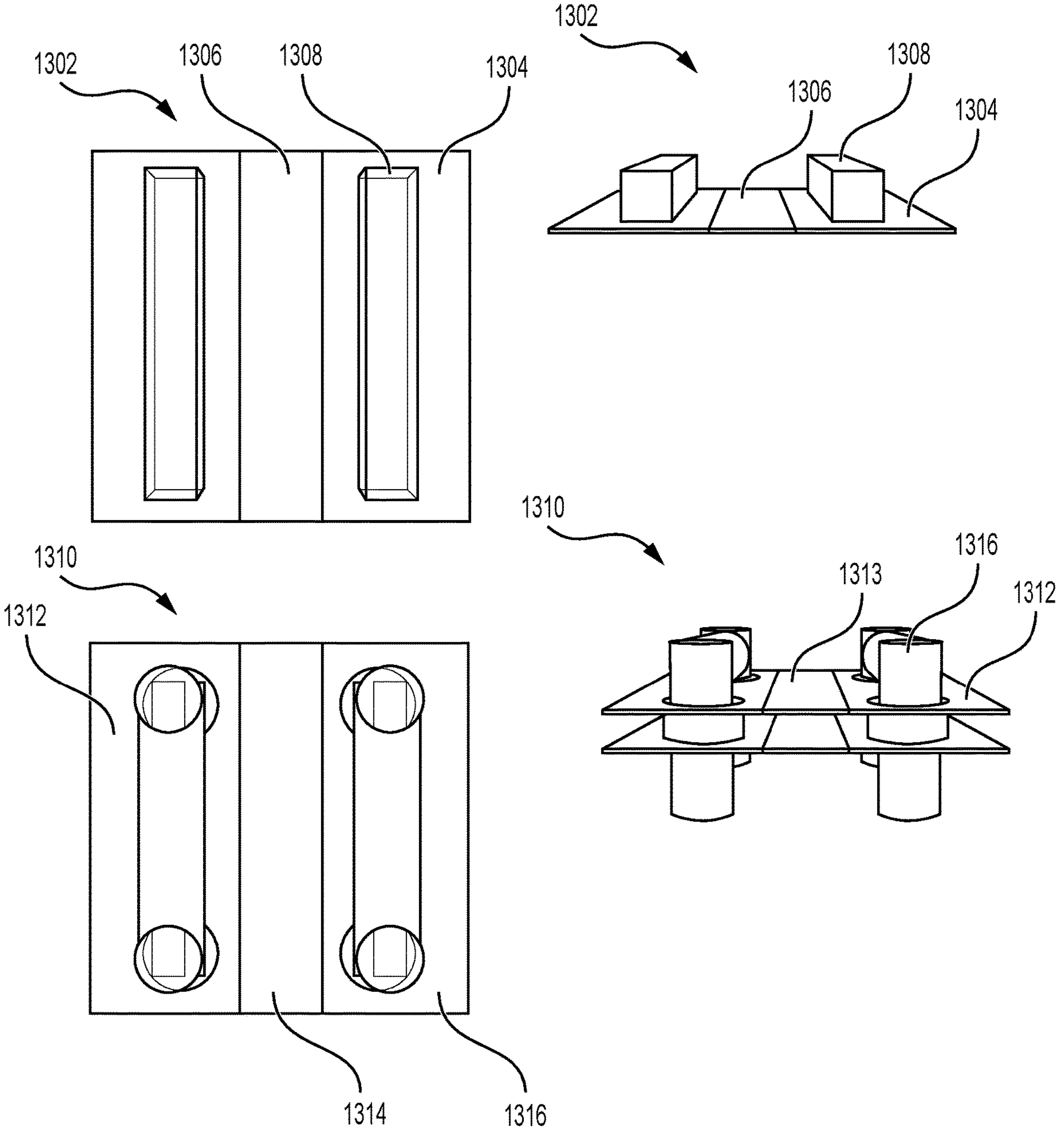
FIG. 13 illustrates a spark gap according to various embodiments.

FIG. 13 illustrates spark gaps 1302 and 1310. The spark gap 1302 has conductors 1304 separated by gap 1306, which may have the irregularly disposed conductive material in the gap. The conductors 1304 have conductive pads 1308 attached thereto to increase the effective mass of each conductor so that the spark gap can provide the surge withstand capacity of 96 events for higher surges.

The spark gap 1310 has conductors 1312 separated by gap 1313, which may have the irregularly disposed conductive material in the gap. The conductors 1312 may have conductive wire 1316, 1318 attached thereto via through holes formed in the conductors 1312 to increase the effective mass of each conductor so that the spark gap can provide the surge withstand capacity of 96 events for higher surges.

In some embodiments, the spark gaps may be used with high voltage devices such as 90 VAC line taps. In this instance, the width of the spark gap may be increased to about 32.5 mils to increase the lower limit of the spark over voltage to above 200 volts.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A spark gap device configured to provide an enhanced spark over voltage so as to protect an electronic device connected to the spark gap device, comprising:

a printed circuit board;

an input disposed on the printed circuit board and configured to receive signals;

a non-smooth textured substrate surface disposed on a surface of the printed circuit board;

a spark gap disposed on the printed circuit board, the spark gap comprising:

a first conducting electrode configured to be connected to the input;

a second conducting electrode configured to be connected to a ground;

a gap between the first and second conducting electrodes comprising an exposed portion of the substrate surface; and a conductive material configured to be disposed in a non-continuous and irregular manner on the non-smooth textured substrate surface and in the gap between the first and second conducting electrodes;

an output disposed on the printed circuit board;

a capacitor configured to connect between the input and the output;

a first conductive tab and a second conductive tab connected to the first conducting electrode and to the second conducting electrode, respectively, to increase an effective mass of the first and second conducting electrodes so as to provide a surge withstand capacity of 96 events; and wherein the spark gap is structurally configured to provide the enhanced spark over voltage to protect the capacitor and/or an external device connected to the output.

2. The spark gap device of claim 1, wherein the conductive material is non-continuous graphite configured with gaps between graphite particles of not more than 0.004 inches.

3. The spark gap device of claim 1, wherein the enhanced spark over voltage is 1064V±500V.

4. The spark gap device of claim 1, wherein the spark gap is structurally configured to provide a surge withstand capacity of 96 events.

5. The spark gap device of claim 1, wherein a width of the spark gap is about 0.025 inches.

6. The spark gap device of claim 5, wherein a length of the first and second conducting electrodes is 0.040 to 0.080 inches and a thickness of the first and second conducting electrodes is 0.055 to 0.065 inches.

7. The spark gap device of claim 1, further comprising at least one through hole formed in each of the first and second conducting electrodes, and a conductive wire attached to the through holes to increase an effective mass of the first and second conducting electrodes so as to provide a surge withstand capacity of 96 events.

8. The spark gap device of claim 1, wherein a width of the spark gap is about 0.0325 inches configured to provide a spark over voltage of over 200 V to a device connected to the spark gap device.

9. A spark gap device configured to provide an enhanced spark over voltage so as to protect an electronic device connected to the spark gap device, comprising:

a printed circuit board;

a non-smooth textured substrate surface configured to be disposed on a surface of the printed circuit board;

a spark gap configured on the printed circuit board, the spark gap comprising:

a first conducting electrode configured to be connected to an input;

a second conducting electrode configured to be connected to a ground;

a gap having an exposed surface of the substrate configured to be disposed between the first and second conducting electrodes; and a conductive material configured to be disposed in a non-continuous and irregular manner on the non-smooth textured substrate surface and between the first and second conducting electrodes;

at least one through hole formed in each of the first and second conducting electrodes, and a conductive wire attached to the through holes to increase an effective mass of the first and second conducting electrodes so as to provide a surge withstand capacity of 96 events; and wherein the spark gap is structurally configured to provide the enhanced spark over voltage to the spark gap device to protect an external device connected to the spark gap device.

10. The spark gap device of claim 9, wherein the conductive material is non-continuous graphite configured with gaps between graphite particles of not more than 0.004 inches.

11. The spark gap device of claim 9, wherein the enhanced spark over voltage is 1064V±500V.

12. The spark gap device of claim 9, wherein the spark gap is structurally configured to provide a surge withstand capacity of 96 events.

13. The spark gap device of claim 9, wherein a width of the spark gap is about 0.025 inches.

14. The spark gap device of claim 13, wherein a length of the first and second conducting terminals is 0.040 to 0.080 inches and a thickness of the first and second conducting terminals is 0.055 to 0.065 inches.

15. The spark gap device of claim 9, further comprising at least one through hole formed in each of the first and second conducting electrodes, and a conductive wire attached to the through holes to increase an effective mass of the first and second conducting electrodes so as to provide a surge withstand capacity of 96 events.

16. The spark gap device of claim 9, wherein a width of the spark gap is about 0.0325 inches configured to provide a spark over voltage of over 200 V to a device connected to the spark gap device.

17. A spark gap configured to provide an enhanced spark over voltage so as to protect an electronic device connected to the spark gap device, comprising:

a non-smooth textured substrate surface configured to be disposed on a surface of a printed circuit board;

a first conducting electrode configured to be connected to an input;

a second conducting electrode configured to be connected to a ground;

a gap disposed between the first and second conducting electrodes;

a conductive material configured to be disposed in a non-continuous and irregular manner on the non-smooth textured substrate surface and in the gap between the first and second conducting electrodes;

at least one through hole formed in each of the first and second conducting electrodes, and a conductive wire attached to the through holes to increase an effective mass of the first and second conducting electrodes so as to provide a surge withstand capacity of 96 events; and wherein the spark gap is structurally configured to provide the enhanced spark over voltage to protect the electronic device connected to the spark gap.

18. The spark gap of claim 17, wherein the conductive material is non-continuous graphite configured with gaps between graphite particles of not more than 0.004 inches.

19. The spark gap of claim 17, wherein the enhanced spark over voltage is 1064V±500V.

20. The spark gap of claim 17, wherein the spark gap is structurally configured to provide a surge withstand capacity of 96 events.

21. The spark gap of claim 17, wherein a width of the spark gap is about 0.025 inches.

22. The spark gap of claim 21, wherein a length of the first and second conducting terminals is 0.040 to 0.080 inches and a thickness of the first and second conducting terminals is 0.055 to 0.065 inches.

23. The spark gap of claim 17, further comprising a capacitor connected between the first conducting electrode and an output.

24. The spark gap of claim 17, further comprising at least one through hole formed in each of the first and second conducting electrodes, and a conductive wire attached to the through holes to increase an effective mass of the first and second conducting electrodes so as to provide a surge withstand capacity of 96 events.

25. The spark gap device of claim 17, wherein a width of the spark gap is about 0.0325 inches configured to provide a spark over voltage of over 200 V to a device connected to the spark gap device.

26. A spark gap for providing an enhanced spark over voltage so as to protect an electronic device connected to the spark gap device during operation, comprising:

- a non-smooth textured substrate surface structured to be disposed on a surface of a printed circuit board;
- a first conducting electrode structured to be connected to an input;
- a second conducting electrode structured to be connected to a ground;
- a gap disposed between the first and second conducting electrodes;
- a conductive material structured to be disposed in a non-continuous and irregular manner on the non-smooth textured substrate surface and in the gap between the first and second conducting electrodes;
- at least one through hole formed in each of the first and second conducting electrodes, and a conductive wire attached to the through holes to increase an effective mass of the first and second conducting electrodes so as to provide a surge withstand capacity of 96 events; and
- wherein the spark gap is structurally structured and arranged to provide the enhanced spark over voltage to protect the electronic device connected to the spark gap during operation.

27. The spark gap of claim 26, wherein the conductive material is non-continuous graphite configured with gaps between graphite particles of not more 0.004 inches.

28. The spark gap of claim 26, wherein the enhanced spark over voltage is 1064V±500V.

29. The spark gap of claim 26, wherein a width of the spark gap is about 0.025 inches.

30. The spark gap of claim 29, wherein a length of the first and second conducting terminals is 0.040 to 0.080 inches and a thickness of the first and second conducting terminals is 0.055 to 0.065 inches.

31. The spark gap of claim 26, further comprising a capacitor connected between the first conducting electrode and an output.

32. The spark gap of claim 26, further comprising at least one through hole formed in each of the first and second conducting electrodes, and a conductive wire attached to the through holes to increase an effective mass of the first and second conducting electrodes so as to provide a surge withstand capacity of 96 events.

33. The spark gap device of claim 26, wherein a width of the spark gap is about 0.0325 inches structured to provide a spark over voltage of over 200 V during operation to a device connected to the spark gap device.

* * * * *